(12) United States Patent
Jeon et al.

(10) Patent No.: US 11,520,875 B2
(45) Date of Patent: Dec. 6, 2022

(54) ELECTRONIC DEVICE FOR PROCESSING VIDEO SIGNAL AND COMPUTER READABLE RECORDING MEDIUM

(71) Applicant: Samsung Electronics Co., Ltd, Suwon-si (KR)

(72) Inventors: Hye-Kyoung Jeon, Suwon-si (KR); Ho-Seok Kang, Seoul (KR); Jun-Hyun Park, Suwon-si (KR); Sung-Koo Lee, Yongin-si (KR); Woong-Ho Hong, Seoul (KR); Moo-Young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 16/475,951

(22) PCT Filed: Jan. 2, 2018

(86) PCT No.: PCT/KR2018/000052
§ 371 (c)(1),
(2) Date: Jul. 3, 2019

(87) PCT Pub. No.: WO2018/128357
PCT Pub. Date: Jul. 12, 2018

(65) Prior Publication Data
US 2019/0332764 A1 Oct. 31, 2019

(30) Foreign Application Priority Data
Jan. 3, 2017 (KR) .................. 10-2017-0000734

(51) Int. Cl.
*G06F 7/04* (2006.01)
*G06F 12/00* (2006.01)
(Continued)

(52) U.S. Cl.
CPC .............. *G06F 21/45* (2013.01); *G06F 21/32* (2013.01); *G06V 40/19* (2022.01); *G06V 40/197* (2022.01); *H04N 5/33* (2013.01)

(58) Field of Classification Search
CPC .......... G06F 21/45; G06F 21/32; G06F 21/30; G06F 21/31; G06V 40/197; G06V 40/19; H04N 5/33
See application file for complete search history.

(56) References Cited

U.S. PATENT DOCUMENTS

| RE42,038 E | 1/2011 | Abdallah et al. |
| 10,025,916 B2 | 7/2018 | Kim et al. |

(Continued)

FOREIGN PATENT DOCUMENTS

| KR | 10-2014-0079990 A | 6/2014 |
| KR | 10-2015-0029254 A | 3/2015 |

(Continued)

OTHER PUBLICATIONS

International Search Report dated Apr. 16, 2018 in connection with International Patent Application No. PCT/KR2018/000052, 2 pages.
(Continued)

*Primary Examiner* — Farid Homayounmehr
*Assistant Examiner* — Mudasiru K Olaegbe

(57) ABSTRACT

An electronic device according to various embodiments of the present invention comprises: an infrared filter for passing light in an infrared wavelength band; an image sensor for converting the received light into a video signal and outputting the video signal; an infrared light-emitting unit for emitting the light in the infrared wavelength band; and a processor. The processor can execute a first application, confirm a security level of the first application, and authorize the first application with an authority for controlling at least one of the image sensor, the infrared filter and the infrared (Continued)

light-emitting unit according to the confirmed security level of the first application.

13 Claims, 12 Drawing Sheets

(51) Int. Cl.
    *G06F 12/14* (2006.01)
    *G06F 13/00* (2006.01)
    *G06C 7/00* (2006.01)
    *G06F 21/45* (2013.01)
    *G06F 21/32* (2013.01)
    *H04N 5/33* (2006.01)
    *G06V 40/19* (2022.01)
    *G06V 40/18* (2022.01)

(56) References Cited

U.S. PATENT DOCUMENTS

| | | | |
|---|---|---|---|
| 10,237,269 B2 | 3/2019 | Park et al. | |
| 2009/0254572 A1* | 10/2009 | Redlich | G06Q 10/107 |
| 2012/0212619 A1* | 8/2012 | Nagamune | H04N 5/332 |
| | | | 348/E5.09 |
| 2014/0344896 A1* | 11/2014 | Pak | H04L 63/0861 |
| | | | 726/4 |
| 2016/0125239 A1* | 5/2016 | Danikhno | G06F 21/74 |
| | | | 348/78 |

FOREIGN PATENT DOCUMENTS

| KR | 10-2016-0044307 A | 4/2016 |
|---|---|---|
| KR | 10-2016-0115643 A | 10/2016 |
| KR | 10-1657377 B1 | 10/2016 |

OTHER PUBLICATIONS

Written Opinion of the International Searching Authority dated Apr. 16, 2018 in connection with International Patent Application No. PCT/KR2018/000052, 10 pages.

* cited by examiner

ELECTRONIC DEVICE FOR PROCESSING VIDEO SIGNAL AND COMPUTER READABLE RECORDING MEDIUM

CROSS-REFERENCE TO RELATED APPLICATIONS

This application is a 371 of International Application No. PCT/KR2018/000052 filed on Jan. 1, 2018, which claims priority to Korean Patent Application No. 10-2017-0000734 filed on Jan. 3, 2017, the disclosures of which are herein incorporated by reference in their entirety.

BACKGROUND

1. Field

The present disclosure relates to an electronic device that processes an image signal obtained through an image sensor.

2. Description of Related Art

Along with recent technological developments, electronic devices have been developed to execute various functions and provide various services to users through executable functions. For example, an electronic device may provide a payment service, a financial service, etc., through various executable functions.

However, as electronic devices provide services, such as a payment service, a financial service, etc., requiring personal information that should not be exposed to other people, etc., the importance personal information security in electronic devices has been increasing. As such, in line with the increasing importance of security in electronic devices, various security methods such as limiting use by another user have been developed.

For security of an electronic device, user's biological characteristics (e.g., a fingerprint, a retina, an iris, a voice, etc.) may be used and various security methods using a user's biological characteristics have been developed.

Recently, a security method using an iris among the user's biological characteristics has been developed and used. A person's iris differs in shape from person to person, and especially, has a low risk of a forgery and hardly ever changes during a lifetime, such that an iris-based security method has been increasingly used.

Information about the iris of the user is information for identifying the user, and has a high importance of security. Thus, the electronic device may allow an access to the information about the iris of the user or a control over a camera module for obtaining the information about the iris of the user, only through a specific application. Consequently, the security of the information about the iris of the user may be maintained, but utilization of the information about the iris of the user may be degraded.

Various embodiments of the present disclosure provide an electronic device for displaying an image to solve the foregoing or other problems.

SUMMARY

According to various embodiments of the present disclosure, an electronic device includes an infrared filter configured to transmit light in an infrared wavelength band, an image sensor configured to convert received light into an image signal and output the image signal, an infrared emitting diode (IRED) configured to irradiate the light in the infrared wavelength band, and a processor. The processor may be configured to execute a first application, identify a security level of the first application, and assign an authority for controlling at least one of the image sensor, the infrared filter, or the IRED to the first application, based on the identified security level of the first application.

According to various embodiments of the present disclosure, a non-transitory computer-readable recording medium has recorded thereon a program to be executed on a computer, in which the program includes executable instructions that cause, when executed by a processor, the processor to execute a first application, identify a security level of the first application, and assign an authority for controlling at least one of an image sensor, an infrared filter, or an IRED to the first application, based on the identified security level of the first application.

According to various embodiments of the present disclosure, an electronic device includes an infrared filter configured to transmit light in an infrared wavelength band, an image sensor configured to convert received light into an image signal and output the image signal, an IRED configured to irradiate the light in the infrared wavelength band, and a processor. The processor may be configured to execute a first application, identify a security level of the first application, and control an image signal of an iris, obtained through the image sensor, not to be provided to the first application, when determining that control over the IRED is not possible through the first application based on the identified security level of the first application An electronic device according to various embodiments of the present disclosure may identify a security level of an executed application and stepwise assign an authority for controlling each of components included in a camera module based on the identified security level. Therefore, for an application having a high security level, information about an iris of a user may be accessed or obtained, thereby improving utilization of the information about the iris of the user while maintaining security of the information about the iris of the user.

DETAILED DESCRIPTION

Figure 1:
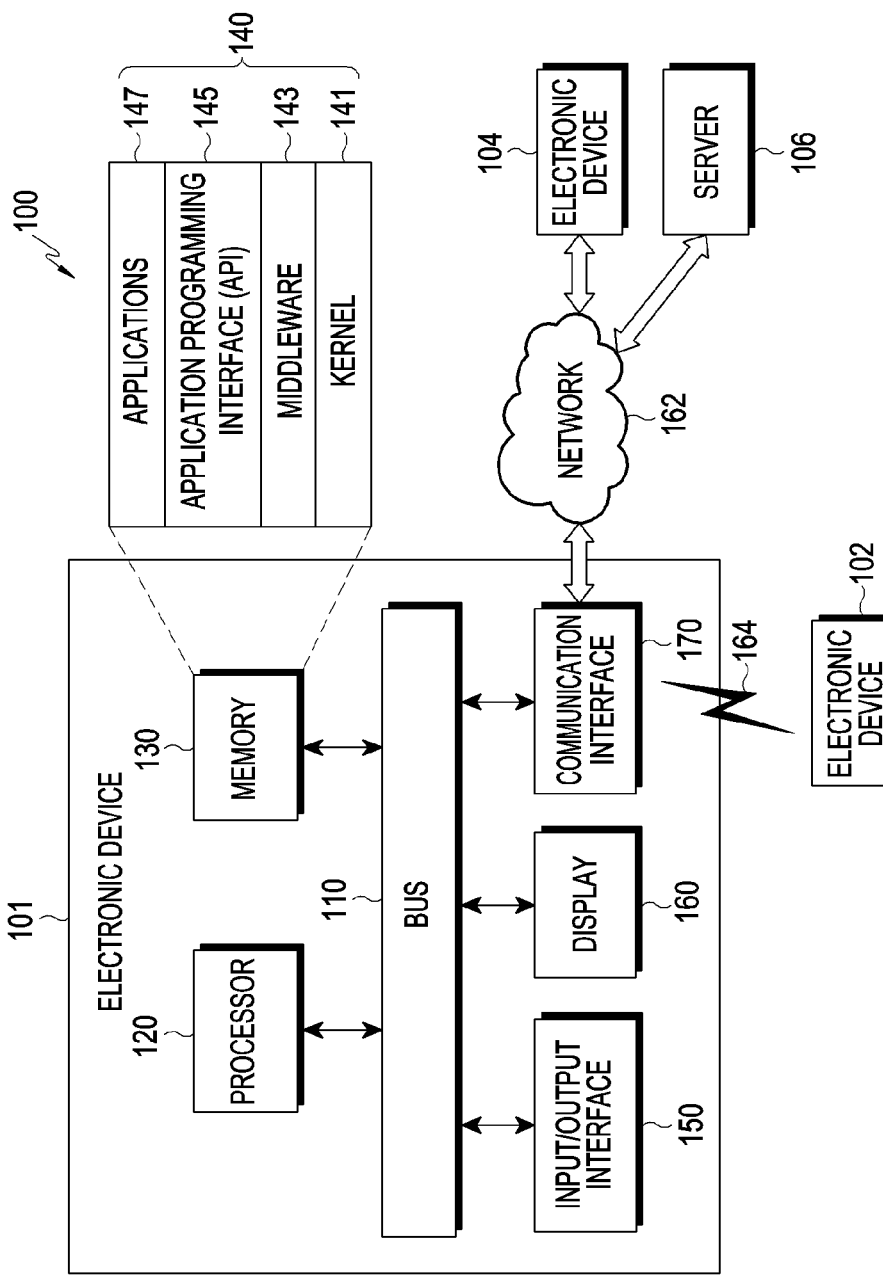
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A and/or B," or "one or more of A and/or B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a point of sale (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a piece of furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 170 and delivering communication (e.g., a control message or data) between the elements 110 to 170. The processor 120 may include one or more of a central processing unit (CPU), an application processor (AP), and a communication processor (CP). The processor 120 may perform operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, a video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
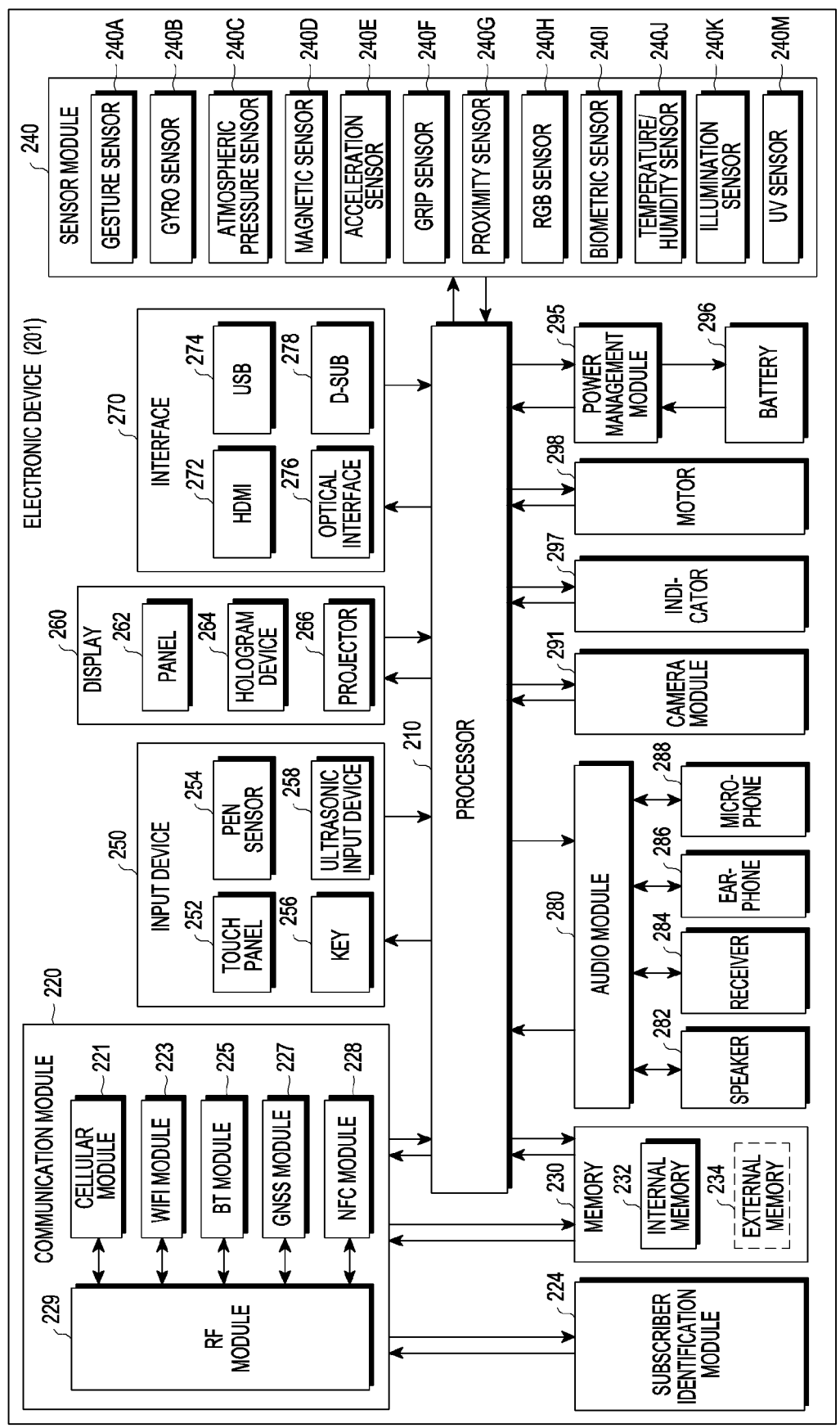
FIG. 2 is a block diagram of a programming module according to various embodiments of the present disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to an embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an Infrared Data Association (IrDA) standard interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or MediaFlo'. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
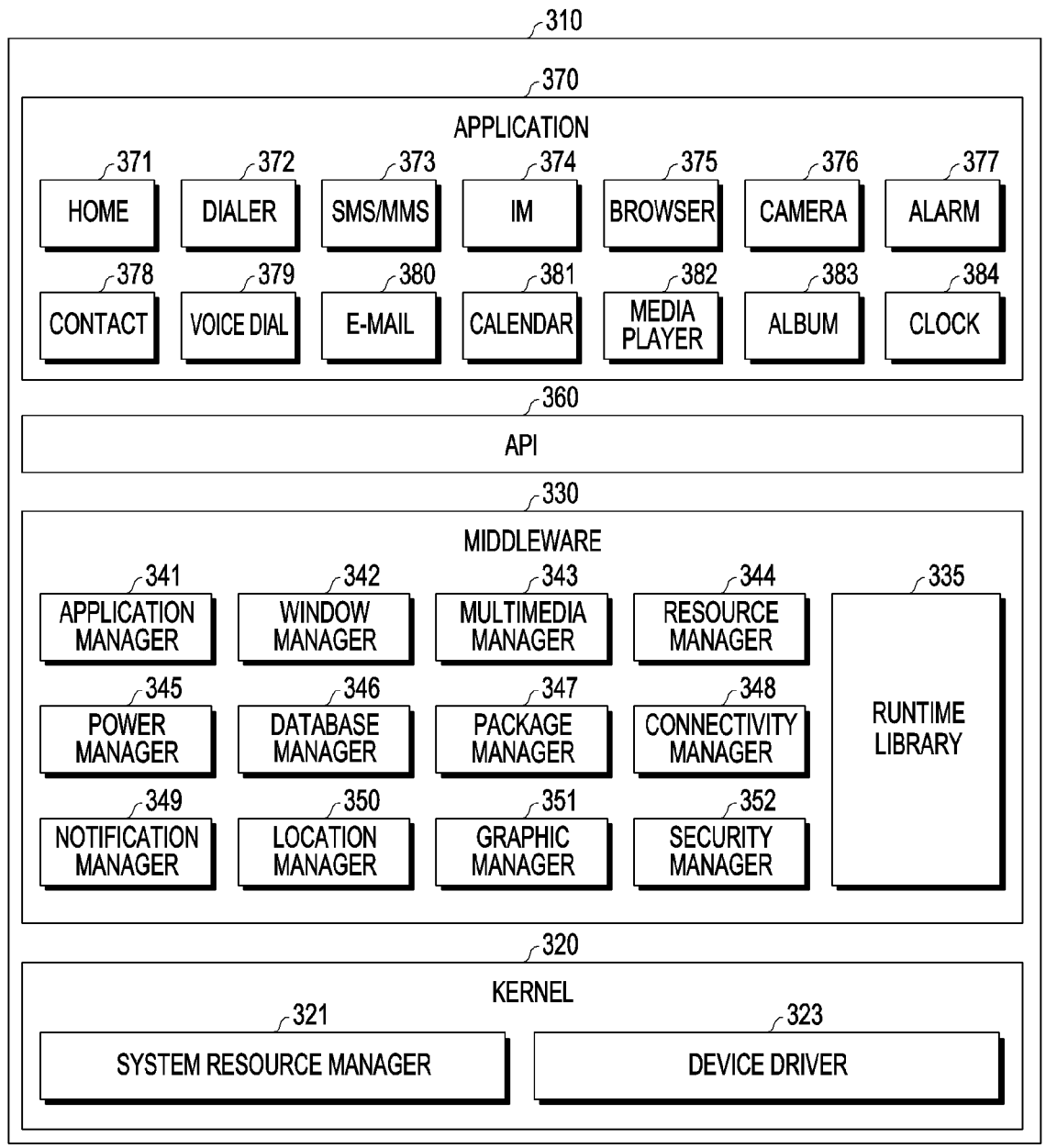
FIG. 3 is a block diagram of an electronic device according to various embodiments of the present disclosure.

FIG. 3 is a block diagram of a programming module according to various embodiments of the present disclosure. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS, Windows™, Symbian™, Tizen, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environmental information application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
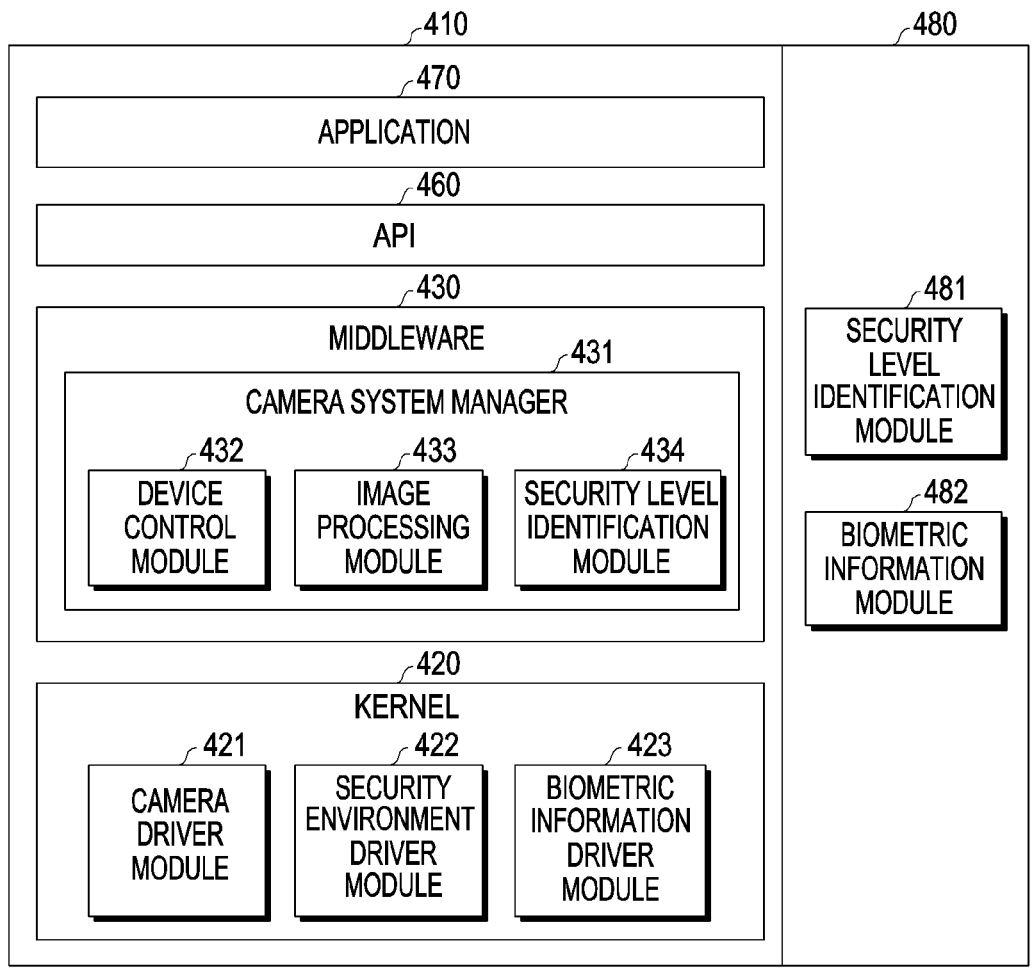
FIG. 4 is a block diagram of a programming module according to various embodiments of the present disclosure.

FIG. 4 is a block diagram of a programming module according to various embodiments of the present disclosure. According to various embodiments of the present disclosure, a programming module 400 (e.g., the program 140) may include a general-region programming module 410 and a security-region programming module 480. Referring to FIG. 4, the general-region programming module 410 may include a kernel 420, middleware 430, an API 460, and/or an application 470. The kernel 420, the middleware 430, the API 460, and/or the application 470 included in the general-region programming module 410 may correspond to the kernel 320, the middleware 330, the API 360, and/or the application 370 described with reference to FIG. 3, respectively, and will not be separately described in terms of matters described above with reference to FIG. 3. The security-region programming module 480 may include a security level identification module 481 and a biometric information module 482. Although not shown, the security-region programming module 480 may include a kernel, middleware, an API, and/or an application like the general-region programming module 410.

According to various embodiments of the present disclosure, at least a part of the programming module 400 may be preloaded on the electronic device or may be downloaded from an external electronic device (e.g., the electronic device 102 or 104, or the server 106). The general-region programming module 410 of the programming module 400 may be preloaded on at least a part of the electronic device, which is operated as a non-security region, and the security-region programming module 480 of the programming module 400 may be preloaded on at least a part of the electronic device, which is operated as a security region.

For example, a processor (e.g., the processor 120) of the electronic device may include a first processor operated in a security region and a second processor operated in a non-security region. The first processor may perform a security-required operation and may be isolated from external access and protected against non-allowed control of the second processor over the non-security region. The first processor and the second processor may be physically separate processors, and the processor may be logically divided into the first processor and the second processor. The first processor may preload the security-region programming module 480, and the second processor may preload the general-region programming module 410.

According to various embodiments of the present disclosure, the kernel 420 may include a camera driver module 421, a security environment driver module 422, and/or a biometric information driver module 423. The camera driver module 421, the security environment driver module 422, and/or the biometric information driver module 423 may be included in the device driver 323 described with reference to FIG. 3.

According to various embodiments of the present disclosure, the camera driver module 421 may control at least one hardware module included in the camera module of the electronic device 101. For example, the camera driver module 421 may control a lens, an image sensor, an infrared filter, and/or an infrared emitting diode (IRED), included in the camera module of the electronic device 101.

According to various embodiments of the present disclosure, the security environment driver module 422 may serve as an interface for delivering a signal, data, a message, etc., to a module included in the security-region programming module 480 from a module included in the general-region programming module 410. For example, in a trustzone according to an embodiment, a separate data path for delivering a message from the general-region programming module 410 to the security-region programming module 480 may be implemented with hardware. In this case, a driver module for accessing the hardware may be the security environment driver module 422. The security environment driver module 422 may deliver a message regarding an operation in the module included in the security-region programming module 480 to the module included in the general-region programming module 810.

According to various embodiments of the present disclosure, the biometric information driver module 423 may control a sensor (e.g., the biometric sensor 240I, etc.) that senses a user's biometric information. For example, the biometric information driver module 423 may deliver the biometric information obtained by the sensor to the biometric information module 482 of the security-region programming module 480 without delivering the same to the general-region programming module 410.

According to various embodiments of the present disclosure, a camera system manager 431 included in the middleware 430 may control a function associated with the camera module of the electronic device 101. The camera system manager 431 may include a device control module 432, an image processing module 433, and a security level identification module 434.

According to various embodiments of the present disclosure, the device control module 432 may control the camera module through the camera driver module 421 based on a security level of an application requesting use of a function associated with the camera module. The image processing module 433 may process an image obtained through the camera module. The security level identification module 434 may receive the security level of the application, identified by the security level identification module 481, through the security environment driver module 422. The security level identification module 434 may assign an authority for controlling at least one hardware module included in the camera module to the application based on the identified security level of the application. The security level identification module 434 may autonomously identify the security level that is set in the application.

According to various embodiments of the present disclosure, the security-region programming module 480 may include a security level identification module 481 and a biometric information module 482. The electronic device 101 may store data requiring high security in a secure environment and perform a related operation through the security-region programming module 480. The security-region programming module 480 may operate on the first processor managed as the security region. The first processor operated in the security region may be a reliable region determined in a manufacturing stage of the electronic device 101. The electronic device 101 may process data requiring high security based on a secure hardware structure through the first processor operated in the security region. As the programming module 400 includes the general-region programming module 410 and the security-region programming module 480, the processor and the memory of the electronic device 101 may physically or logically operate as the general region and the security region.

According to various embodiments of the present disclosure, the security level identification module 481 may manage security level information indicating a security level of each of a plurality of applications. The security level information may be stored in association with identification information (e.g., signing) used to identify each of the plurality of applications. The security level identification module 481 may store the security level information and the identification information, identify a security level of the application, and deliver an identification result to the security level identification module 434 of the general-region programming module 410 through the security environment driver module 422.

According to various embodiments of the present disclosure, the biometric information identification module 482 may store biometric information of the user using the electronic device 101 and compare biometric information obtained through the sensor (e.g., the biometric sensor 240I) with the stored biometric information of the user to authenticate the user. The biometric information identification module 482 may include a fingerprint information identification module, an iris information identification module, etc.

According to various embodiments of the present disclosure, the modules shown in FIG. 4 may be a set of instructions or a code stored in the memory, an instruction/code that is at least temporarily resided in a processor, a storage space that stores the instruction/code, or a part of a circuitry that configures the processor.

Figure 5:
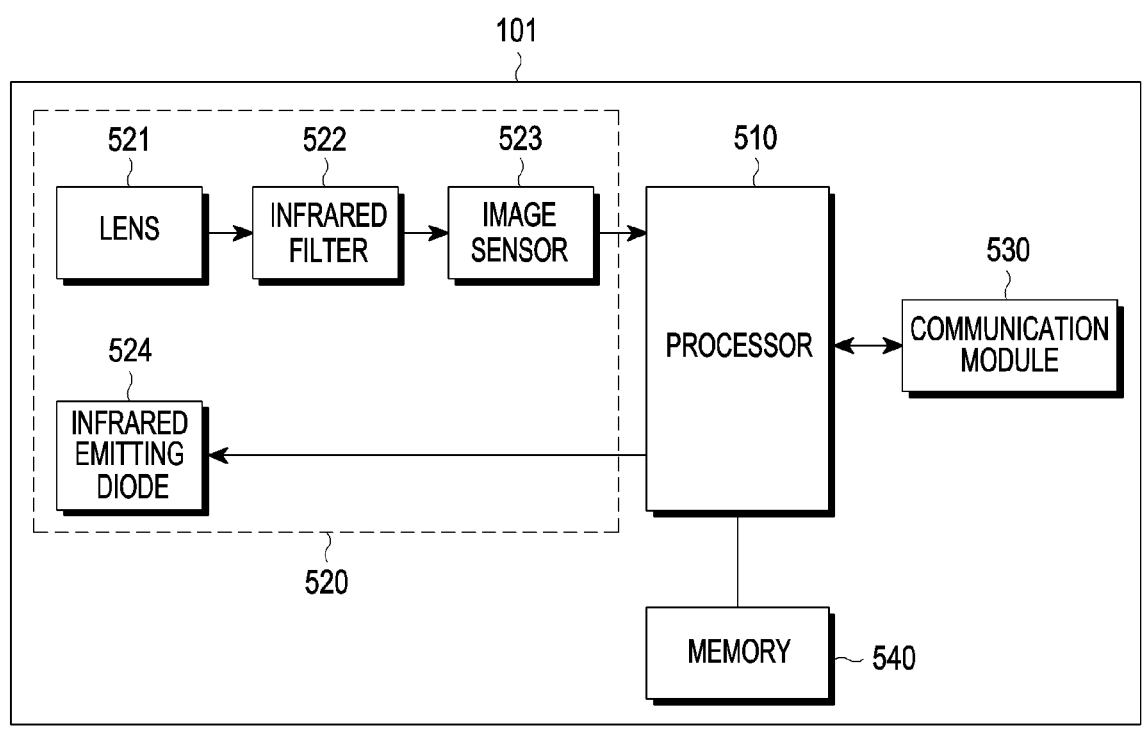
FIG. 5 is a block diagram of at least a partial configuration of an electronic device according to various embodiments of the present disclosure.

FIG. 5 is a block diagram of at least a partial configuration of an electronic device according to various embodiments of the present disclosure.

According to various embodiments of the present disclosure, the electronic device 101 may include a processor 510, a camera module 520, a communication module 530, and a memory 540. Although not shown in FIG. 5 for convenience of a description, the electronic device 101 may include various components described in FIGS. 2 through 4. In addition, although not shown, the components included in the electronic device 101 may be arranged in a housing of the electronic device 101.

According to various embodiments of the present disclosure, the camera module 520 may be included in the electronic device 101 as shown in FIG. 5, or may be separate from the electronic device 101 although not shown. When the camera module 520 is separate from the electronic device 101, the camera module 520 may be wiredly or wirelessly connected with the electronic device 101 to transmit or receive a signal, data, etc.

According to various embodiments of the present disclosure, the camera module 520 may include a lens 521, an infrared filter 522, an image sensor 523, and an IRED 524. The lens 521 may transmit light reflected from an object. The processor 510 may adjust a focus of the lens 521 to photograph the object. For example, to photograph an iris, the processor 510 may adjust the focus of the lens 521 according to a user input or an algorithm for iris photographing.

The infrared filter 522 may transmit light in an infrared wavelength band of light that is reflected from the object after being incident through the lens 521. When the infrared filter 522 is turned on, the image sensor 523 may receive light in the infrared wavelength band, which has passed through the infrared filter 522, convert the received light in the infrared wavelength band into an image signal, and output a generated infrared light image. The processor 510 may output the infrared light image output from the image sensor 523 through the display 160.

The IRED 524 may irradiate the light in the infrared wavelength band. The processor 510 may control the IRED 524 to irradiate the light in the infrared wavelength band to the user, when capturing an iris of the user. The processor 510 may control a light irradiation direction or a pulse pattern of irradiation light of the IRED 524 such that the light in the infrared wavelength band is irradiated to a face or both eyes of the user.

The image sensor 523 may receive the light incident through the lens 521 and output a visible light image generated by converting the received light into an image signal. When the infrared filter 522 is turned on, the image sensor 523 may receive light in the infrared wavelength band, which has passed through the infrared filter 522 and may output an infrared light image generated by converting the received light in the infrared wavelength band into an image signal.

According to various embodiments of the present disclosure, the processor 510 may execute a first application. The processor 510 may execute the first application selected by a user's input from among a plurality of applications installed in the electronic device 101, and display an execution screen of the first application through the display.

According to various embodiments of the present disclosure, the processor 510 may identify a security level of the first application. A security level of each of a plurality of distributed applications may be set or changed by a manufacturer of the electronic device 101, a distributor of an application, an external authentication organization, etc. The processor 510 may identify the security level of the first application in execution or installation of the first application.

Security level information indicating a security level of each of the plurality of applications may be stored in an external electronic device that manages a security level of an application, or the memory 540. The security level information may be stored in association with identification information (e.g., signing information, etc.) used to identify each of the plurality of applications. The security level information may be stored in the security region that is set in the external electronic device or the memory 540. The processor 510 may identify the security level of the first application, based on the security level information stored in the external server or the memory 540.

According to various embodiments of the present disclosure, a security level may be set for each of a plurality of functions provided in an application. A security level of each of the plurality of functions provided in the application may be set or changed by the manufacturer of the electronic device 101, the distributor of the application, the external authentication organization, etc.

Thus, a different security level may be applied to an identical application according to an execution function. Information indicating the security level of each of the plurality of functions provided in the application may be included in the security level information, and the processor 510 may identify the security level for each of the plurality of functions provided in the application, based on the security level information.

According to various embodiments of the present disclosure, the processor 510 may include a first processor operated in a security region and a second processor operated in a non-security region. The first processor may perform a security-required operation and may be isolated from external access and protected against non-allowed control of the second processor over the non-security region. The first processor and the second processor may be physically separate processors, and the processor 510 may be logically divided into the first processor and the second processor.

According to various embodiments of the present disclosure, the first processor included in the processor 510 may perform an operation of identifying the security level of the first application. To prevent leakage, change, deletion, etc., of security levels of applications, the first processor operated in the security region may identify a security level of an application.

For example, the second processor included in the processor 510 may request the first processor to identify the security level of the first application. The first processor having received the request for identifying the security level may identify the security level of the first application. The first processor may deliver a result of identifying the security level of the first application to the second processor.

For example, the first processor may identify the security level of the first application based on information stored in the memory 540, when the security level information is stored in the memory 540. To reinforce security, the security level information may be stored in the security region that is set in the memory 540. Thus, the first processor operated as the security region may access the security level information, and an access of the second processor operated as the non-security region to the security level information may be prevented.

According to various embodiments of the present disclosure, when the security level information is stored in the external electronic device that manages security levels of applications, the first processor may request the external electronic device to identify the security level of the first application through the communication module 530. The first processor may identify the security level of the first application based on a response received from the external electronic device through the communication module 530.

According to various embodiments of the present disclosure, it has been described above that the first processor operated in the security region identifies the security level of the application, but the present disclosure is not limited thereto such that the second processor operated in the non-security region may also identify the security level of the application according to user's settings, etc. A method of identifying a security level of a function provided in an application is the same as the above-described method of identifying a security level of an application and thus will not be described separately.

According to various embodiments of the present disclosure, the processor 510 may assign an authority for controlling at least one of the infrared filter 522, the image sensor 523, and the IRED 524 to the first application based on the identified security level of the first application. For example, the processor 510 may identify an authority corresponding to the identified security level of the first application according to a preset criterion and assign the identified authority to the first application.

The preset criterion may be set such that an authority of a higher level may be assigned for a higher security level. For a higher level of the authority, a controllable range for at least one of the infrared filter 522, the image sensor 523, and the IRED 524 may be extended. The preset criterion may be set in various ways by a manufacturer, a user, etc., of the electronic device 101.

For example, the processor 510 may assign a first authority for controlling the image sensor 523 to the first application, when identifying the security level of the first application as a first security level. Herein, the first security level may be the lowest security level. In this case, the processor 510 may not be able to control the infrared filter 522 and/or the IRED 524, and may control the image sensor 523 through the first application assigned with the first authority. As such, the processor 510 may not allow the first application to use the infrared filter 522 and/or the IRED 524, but may allow the first application to use the image sensor 523 for generation of a visible light image, when identifying the security level of the first application as the first security level.

For example, the processor 510 may assign a second authority for controlling the image sensor 523 and the infrared filter 522 to the first application, when identifying the security level of the first application as a second security level. Herein, the second security level may be higher than the first security level. In this case, the processor 510 may not control the IRED 524 and may control the image sensor 523 and the infrared filter 522, through the first application assigned with the second authority. As such, the processor 510 may not allow the first application to use the IRED 524, but may allow the first application to use the image sensor 523 and the infrared filter 522, when identifying the security level of the first application as the first security level.

For example, the processor 510 may assign a third authority for controlling on/off operations of the image sensor 523, the infrared filter 522, and the IRED 524, when identifying the security level of the first application as a third security level. Herein, the third security level may be higher than the second security level. In this case, the processor 510 may not control an operation other than the on/off operation of the IRED 524, and may control the on/off operations of the image sensor 523, the infrared filter 522, and the IRED 524. As such, the processor 510 may allow the first application to use the image sensor 523 and the infrared filter 522 while allowing the first application to control the on/off operation of the IRED 524, when identifying the security level of the first application as the third security level.

For example, the processor 510 may assign a fourth authority for controlling operations of the image sensor 523, the infrared filter 522, and the IRED 524, when identifying the security level of the first application as a fourth security level. Herein, the fourth security level may be higher than the third security level. In this case, the processor 510 may control operations of the image sensor 523, the infrared filter 522, and the IRED 524. For example, the processor 510 may control the IRED 524 such that an irradiation direction of infrared light and/or a pulse pattern of infrared light are a selected irradiation direction and/or a selected pulse pattern. As such, the processor 510 may allow the first application to use the image sensor 523 and the infrared filter 522 while allowing the first application to control an operation of the IRED 524, when identifying the security level of the first application as the fourth security level.

The above-described method of assigning an authority based on a security level is merely intended for a description, and the present disclosure is not limited thereto such that a security level and an authority assigned based on the security level may set variously. In this way, the processor 510 may stepwise assign an authority of a higher level to an application of a higher security level.

According to various embodiments of the present disclosure, the processor 510 may determine whether to process a control command for controlling at least one of the infrared filter 522, the image sensor 523, and the IRED 524 through the first application, based on the authority assigned to the first application.

According to various embodiments of the present disclosure, the processor 510 may identify whether a control command for controlling at least one of the infrared filter 522, the image sensor 523, and the IRED 524 falls within an authority range assigned to the first application. The processor 510 may control the at least one of the infrared filter 522, the image sensor 523, and the IRED 524 to perform an operation corresponding to the control command, when the control command falls within the authority range assigned to the first application.

According to various embodiments of the present disclosure, the processor 510 may not perform the operation corresponding to the control command, when the control command deviates from the authority range assigned to the first application. In this case, the processor 510 may provide a notification indicating that the operation corresponding to the control command may not be performed.

For example, when the first authority is assigned to the first application, the processor 510 may determine that the control command for controlling the image sensor 523 through the first application falls within a range of the first authority. Thus, the processor 510 may perform a control operation of the image sensor 523 according to the control command.

For example, the processor 510 may determine that the control command for controlling the IRED 522 through the first application deviates from the range of the first authority. Thus, the processor 510 may provide a notification indicating that the control operation of the IRED 522 may not be performed, without performing the control operation of the IRED 522 according to the control command.

According to various embodiments of the present disclosure, the processor 510 may manage an image signal or data provided to the first application, based on the authority assigned to the first application. For example, the processor 510 may determine whether to provide an image signal obtained through the image sensor 523 of the camera module 520 to the first application, based on the authority assigned to the first application.

The processor 510 may control the image signal to be provided to the first application when determining that the providing of the image signal falls within the authority range assigned to the first application. On the other hand, the processor 510 may control the image signal not to be provided to the first application, when determining that the providing of the image signal deviates from the authority range assigned to the first application.

For example, when the first authority is assigned to the first application, the processor 510 may control an image signal, which is obtained by converting light that passes through the IRED 522 after being obtained from the image sensor 523 of the camera module 520, not to be provided to the first application assigned with the first authority. The processor 510 may control an image signal of an iris, which is obtained from the image sensor 523, not to be provided to the first application assigned with the first authority.

For example, when the second authority is assigned to the first application, the processor 510 may control an image signal of an iris, which is obtained from the image sensor 523, not to be provided to the first application assigned with the second authority.

For example, when the third authority is assigned to the first application, the processor 510 may control an image signal of an iris, which is obtained from the image sensor 523, not to be provided to the first application assigned with the third authority, and control a result of iris recognition performed using the image signal of the iris to be provided to the first application assigned with the third authority.

The processor 510 may obtain the image signal of the iris from the image sensor 523 based on an iris recognition command through the first application. The processor 510 may perform iris recognition by using the image signal of the iris through a second application assigned with an authority for iris recognition, without delivering the obtained image signal of the iris directly to the first application. The processor 510 may control the result of iris recognition performed using the second application to be provided to the first application assigned with the third authority.

For example, when the fourth authority is assigned to the first application, the processor 510 may control an image signal of an iris, which is obtained from the image sensor 523, to be provided to the first application assigned with the fourth authority.

The processor 510 may obtain the image signal of the iris from the image sensor 523 based on an iris recognition command through the first application. The processor 510 may control the obtained image signal of the iris to be provided to the first application assigned with the fourth authority.

As such, the processor 510 may determine whether to provide an image signal obtained through the image sensor 523 to the first application as well as whether to process a control command for a component included in the camera module 520, based on the authority assigned to the first application.

According to various embodiments of the present disclosure, the processor 510 may identify a security level of a first function among a plurality of functions provided in the first application. For example, the processor 510 may identify the security level of the first function among the plurality of functions when the first function is executed in response to a user's request, etc. The processor 510 may also identify a security level of each of the plurality of functions provided in the first application, including the first function, in installation of the first application.

According to various embodiments of the present disclosure, the processor 510 may determine whether to limit the authority assigned to the first application to execute the first function through the first application, based on the identified security level of the first function. A security level of each of the plurality of functions provided in the first application may differ, such that the processor 510 may identify the security level of the first function and determine whether to limit the authority assigned to the first application based on the identified security level.

For example, when the security level of the first function is lower than the security level of the first application, the processor 510 may determine to limit at least a part of the authority assigned to the first application based on the security level of the first function. When the security level of the first function is lower than the security level of the first application, the authority assigned based on the security level of the first application may not be entirely used, and thus the processor 510 may limit the assigned authority.

For example, when the security level of the first function is the same as the security level of the first application, the processor 510 may not limit the assigned authority.

When the security level of the first function is higher than the security level of the first application, the processor 510 may assign an additional authority based on the security level of the first function. Thus, the processor 510 may enable control based on the assigned additional authority in execution of the first function through the first application.

Figure 6:
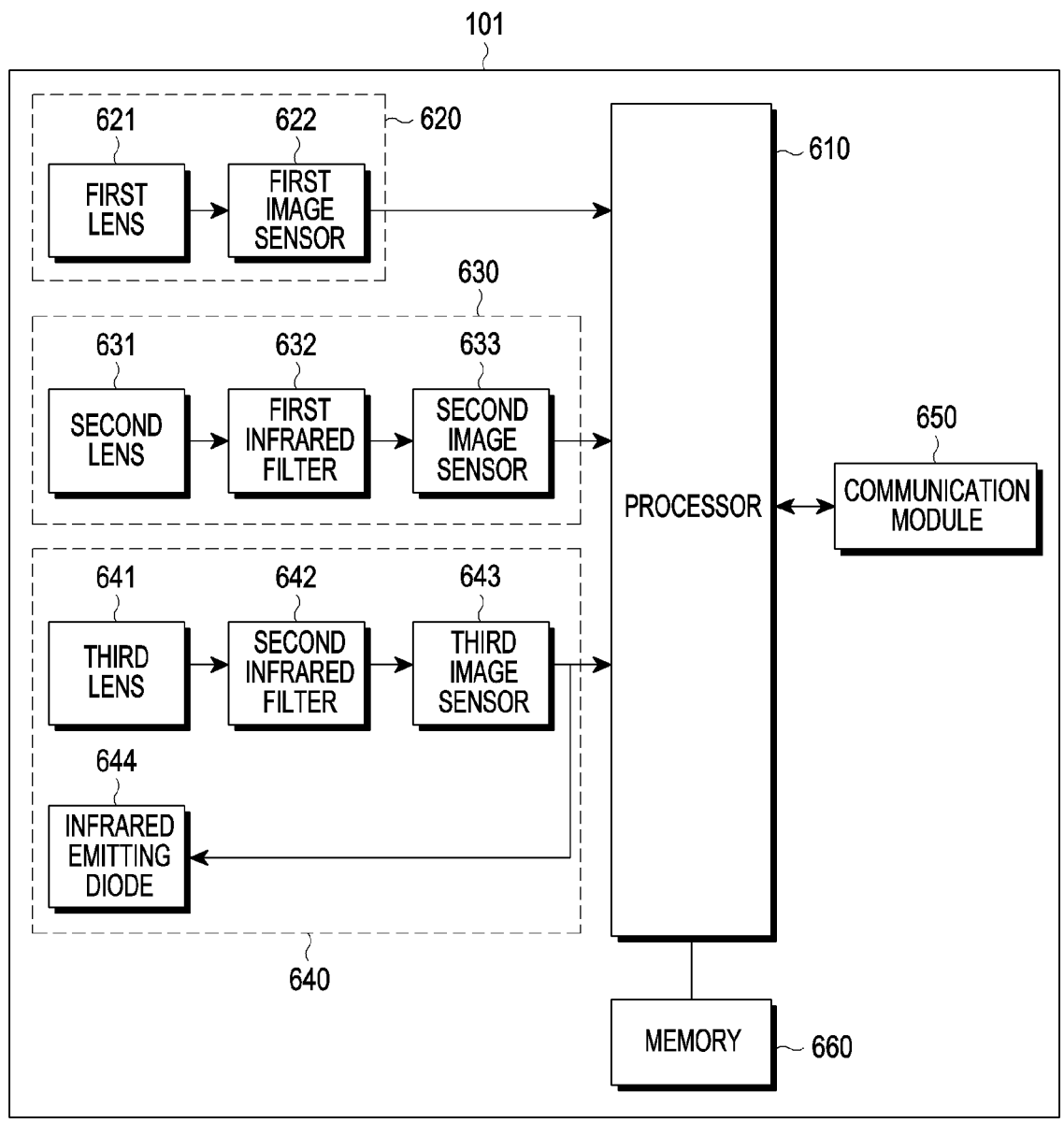
FIG. 6 is a block diagram of at least a partial configuration of an electronic device according to various embodiments of the present disclosure.

FIG. 6 is a block diagram of at least a partial configuration of an electronic device according to various embodiments of the present disclosure.

According to various embodiments of the present disclosure, the electronic device 101 may include a processor 610, a first camera module 620, a second camera module 630, a third camera module 640, a communication module 650, and a memory 660.

The first camera module 620 may include a first lens 621 and a first image sensor 622. The second camera module 630 may include a second lens 631, a first infrared filter 632, and a second image sensor 633. The third camera module 640 may include a third lens 641, a second infrared filter 642, a third image sensor 643, and an IRED 644.

According to various embodiments of the present disclosure, the processor 610 may identify a security level of the first application. A detailed method of identifying a security level is the same as the description made with reference to FIG. 4, and thus will not be described separately.

According to various embodiments of the present disclosure, the processor 610 may assign an authority for controlling at least one of the first camera module 620, the second camera module 630, and the third camera module 640 to the first application based on the identified security level of the first application.

For example, the processor 610 may assign the first authority for controlling the first camera module 620 to the first application when identifying that the security level of the first application as the first security level. In this case, the processor 610 may control an image signal obtained through the second camera module 630 and the third camera module 640, not to be provided to the first application assigned with the first authority.

For example, the processor 610 may assign the second authority for controlling the second camera module 630 to the first application, when identifying that the security level of the first application as the second security level. In this case, the processor 610 may control an image signal obtained through the third camera module 640 not to be provided to the first application assigned with the second authority.

For example, the processor 610 may assign the third authority for controlling the third camera module 640 to the first application, when identifying the security level of the first application as the third security level. However, the processor 610 may control only an on/off operation for the IRED 644 through the first application assigned with the third authority. In this case, the processor 610 may control an image signal of an iris, which is obtained through the third camera module 640, not to be provided to the first application assigned with the third authority.

For example, the processor 610 may assign the fourth authority for controlling any operation of the third camera module 640 to the first application, when identifying the security level of the first application as the fourth security level. In this case, the processor 610 may control an image signal obtained through the third camera module 640 to be provided to the first application assigned with the second authority.

Figure 7:
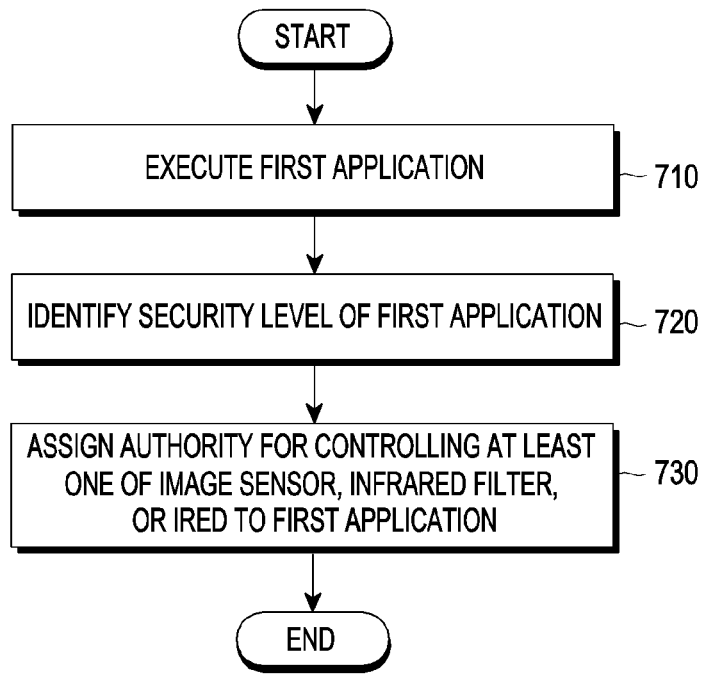
FIG. 7 is a flowchart illustrating a method for assigning an authority based on a security level by an electronic device according to various embodiments of the present disclosure.

FIG. 7 is a flowchart illustrating a method for assigning an authority based on a security level by an electronic device according to various embodiments of the present disclosure.

In operation 710, the electronic device (the electronic device 101 or the processor 510) may execute the first application. The electronic device 101 may display an execution screen of the executed first application.

In operation 720, the electronic device 101 or the processor 510 may identify a security level of the first application. The electronic device 101 or the processor 510 may identify the security level of the first application, based on security level information indicating a security level of each of a plurality of applications stored in an external server that manages security levels of applications or stored in a memory of the electronic device 101.

In operation 730, the electronic device 101 or the processor 510 may assign an authority for controlling at least one of the image sensor, the infrared filter, and the IRED included in the electronic device 101 to the first application, based on the identified security level of the first application.

For example, the electronic device 101 or the processor 510 may determine whether to process a control command for controlling at least one of the infrared filter, the image sensor, and the IRED through the first application, based on the authority assigned to the first application.

For example, the electronic device 101 or the processor 510 may manage an image signal or data provided to the first application, based on the authority assigned to the first application.

Figure 8:
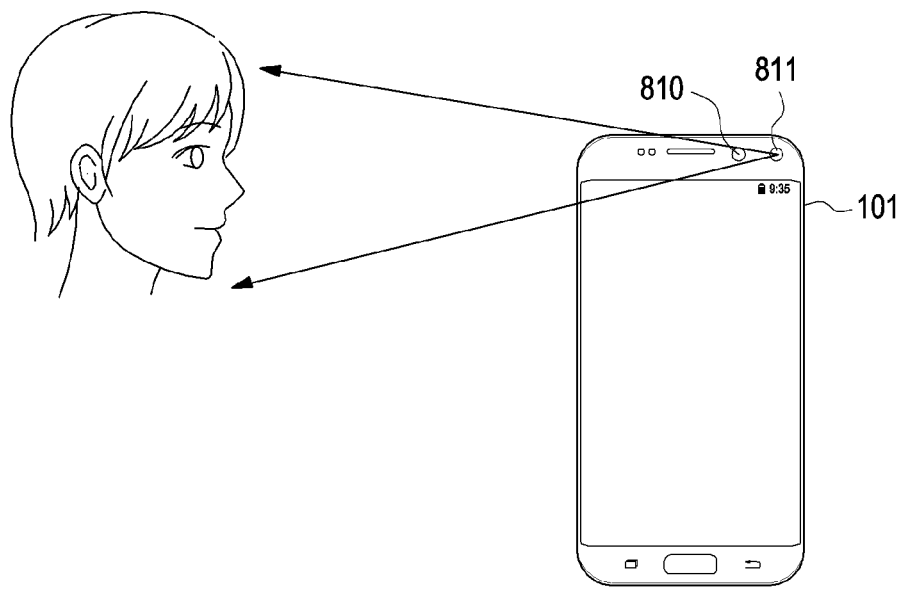
FIG. 8 is a view for describing a method for controlling a camera module of an electronic device through an authority-assigned application according to various embodiments of the present disclosure.

FIG. 8 is a view for describing a method for controlling a camera module of an electronic device through an authority-assigned application according to various embodiments of the present disclosure.

Referring to FIG. 8, a display of the electronic device 101 may be exposed through a first portion of a first face of a housing of the electronic device 101. A camera module may be arranged on the first face of the housing of the electronic device 101. For example, as shown in FIG. 8, a lens, an infrared filter, and an image sensor of the camera module may be arranged on a second portion 810 of the first face, and the IRED may be arranged on a third portion 811 of the housing.

The electronic device 101 may receive light reflected from an object through the camera module, convert the received light into an image signal, and output the image signal. The electronic device 101 may perform general photographing by receiving the light reflected from the object, without operating the infrared filter and the IRED of the camera module.

The electronic device 101 may output an image signal converted from an optical signal in an infrared wavelength band of the light reflected from the object, which has passed through the infrared filter, by operating the infrared filter. Thus, the electronic device 101 may perform an infrared camera function.

The electronic device 101 may irradiate the light in the infrared wavelength band, which is irradiated through the IRED, to the face or both eyes of the user. The electronic device 101 may irradiate the light in the infrared wavelength band to the face or both eyes of the user, capture the face or both eyes of the user, and output an image signal of the iris of the user. The electronic device 101 may perform iris recognition by using the image signal of the iris of the user.

Figure 9:
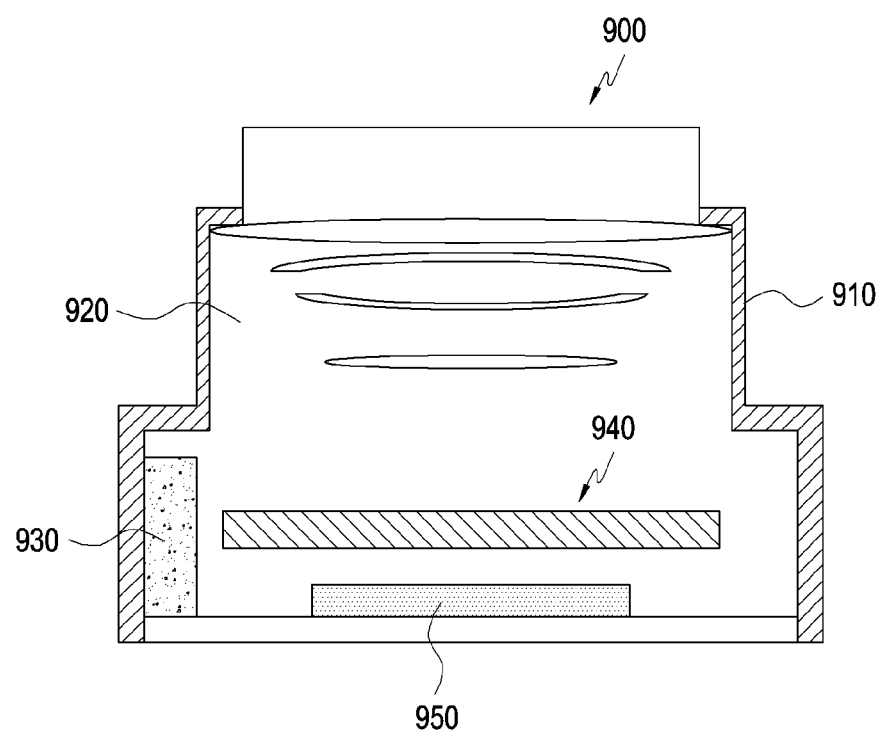
FIG. 9 is a structural diagram of a camera module of an electronic device according to various embodiments of the present disclosure.

FIG. 9 is a structural diagram of a camera module of an electronic device according to various embodiments of the present disclosure.

According to various embodiments of the present disclosure, a camera module 900 included in the electronic device 101 may include a housing 910, a lens 920, a switching driver 930, an infrared filter 940, and an image sensor 950.

According to various embodiments of the present disclosure, the lens 920 may transmit light reflected from an object. The lens 920 may include a plurality of lenses as shown in FIG. 9.

According to various embodiments of the present disclosure, the camera module 900 may perform any one of visible light image capturing or infrared light image capturing, under control of the processor of the electronic device 101. The camera module 900 may perform visible light image capturing or infrared light image capturing according to an operation of the infrared filter 940. For example, the processor of the electronic device 101 may turn on or off the infrared filter 940 through the switching driver 930. The camera module 900 may perform infrared light image capturing when the infrared filter 940 is turned on, and the camera module 900 may perform visible light image capturing when the infrared filter 940 is turned off.

According to various embodiments of the present disclosure, the electronic device 101 may include a camera module for performing infrared light image capturing and a camera module for performing visible light image capturing. In this case, the camera module for performing visible light image capturing may not include the infrared filter 940.

According to various embodiments of the present disclosure, when the infrared filter 940 is turned on, the image sensor 950 may receive light in the infrared wavelength band, which has passed through the infrared filter 940, convert the received light in the infrared wavelength band into an image signal, and output a generated infrared light image. When the infrared filter 940 is turned off, the image sensor 950 may receive light incident through the lens 920 and output a visible light image generated by converting the received light into an image signal.

Although not shown, an IRED for irradiating light in the infrared wavelength band may be arranged in an exterior of the housing 910 as shown in FIG. 8, or may be arranged in an interior of the housing 910.

Figure 10:
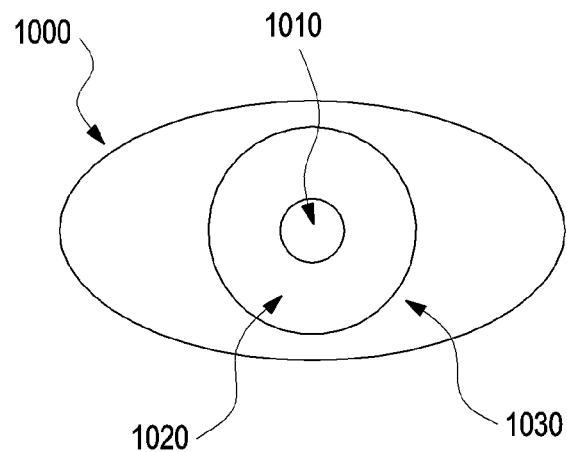
FIG. 10 is a view for describing a method for recognizing an iris of a user according to various embodiments of the present disclosure.

FIG. 10 is a view for describing a method for recognizing an iris of a user according to various embodiments of the present disclosure.

Referring to FIG. 10, an eye 1000 of the user may include a pupil 1010, an iris 1020, and a sclera 1030, and the electronic device 101 may irradiate light in an infrared wavelength band, irradiated through the IRED, to the eye 1000 and photograph the user's eye 1000 through the camera module.

This iris recognition technology is to authenticate the user by using a donut-shape iris pattern between a central black pupil and a sclera (the white of the eye) in the eye of a person. The person's iris has 266 measurable features, and a user may be identified based on the measurable features of the iris. The person's iris is shaped over about 18 months after birth and is protected by an eyelash, an eyelid, and the pupil, and thus the shape of the iris is not easily changed throughout lifetime of the person thereafter, thereby having a higher consistency than other biometric features such as a fingerprint, a signature, voice, face, etc.

Figure 11:
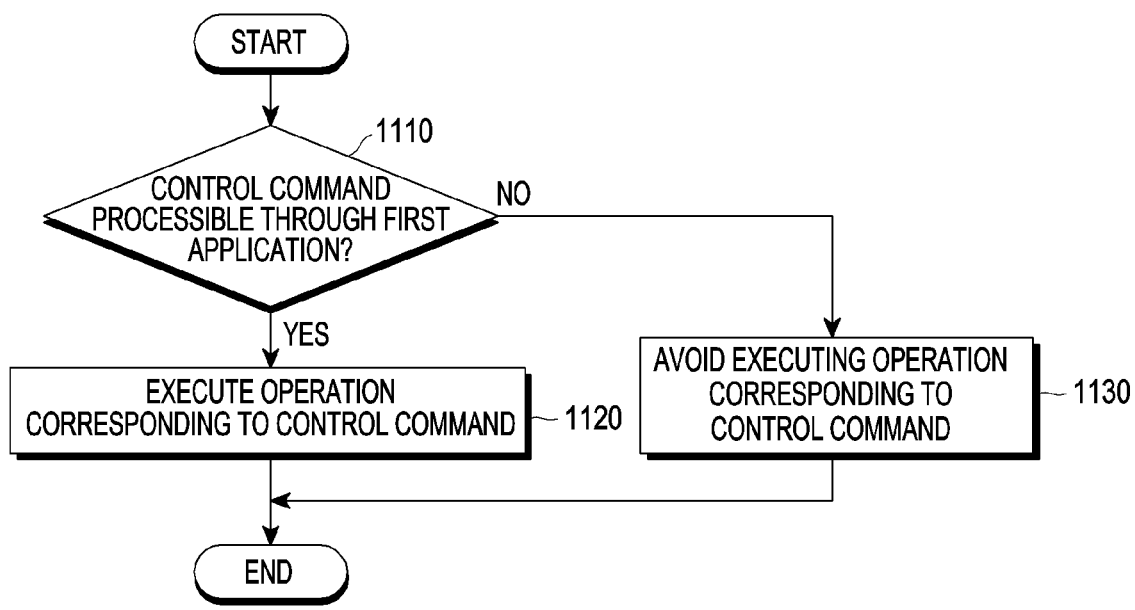
FIG. 11 is a flowchart illustrating a method for determining whether to process a control command through an application by an electronic device according to various embodiments of the present disclosure.

FIG. 11 is a flowchart illustrating a method for determining whether to process a control command through an application by an electronic device according to various embodiments of the present disclosure.

In operation 1110, the electronic device 101 or the processor 510 may determine whether to process a control command for controlling at least one of the infrared filter, the image sensor, and the IRED of the electronic device 101 through the first application. For example, the electronic device 101 or the processor 510 may determine whether the control command falls within an authority range assigned to the first application, based on the authority assigned to the first application.

In operation 1120, when determining that the control command is processable, the electronic device 101 or the processor 510 may control at least one of the infrared filter, the image sensor, and the IRED to perform an operation corresponding to the control command.

For example, the electronic device 101 or the processor 510 may determine that the control command is processable, when the control command falls within the authority range assigned to the first application.

In operation 1130, when determining that the control command is not processable, the electronic device 101 or the processor 510 may not perform the operation corresponding to the control command.

For example, the electronic device 101 or the processor 510 may determine that the control command is not processable, when the control command deviates from the authority range assigned to the first application.

In this case, the electronic device 101 or the processor 510 may provide a notification indicating that the operation corresponding to the control command may not be performed. For example, the electronic device 101 or the processor 510 may display the notification through a display, output a voice as the notification through the speaker, or generate vibration as the notification.

Figure 12:
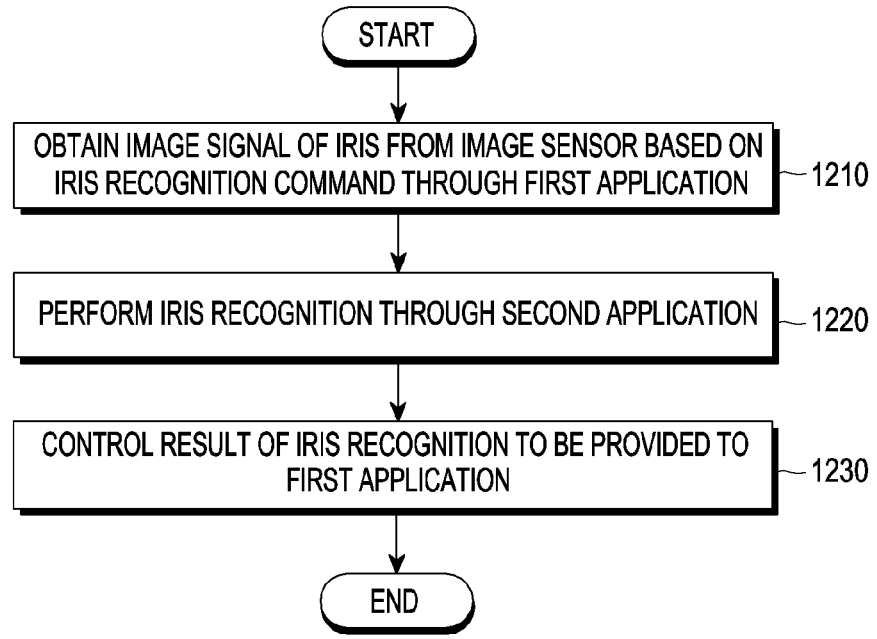
FIG. 12 is a flowchart illustrating a method for providing an iris recognition result through an application of a specific security level by an electronic device according to various embodiments of the present disclosure.

FIG. 12 is a flowchart illustrating a method for providing an iris recognition result through an application of a specific security level by an electronic device according to various embodiments of the present disclosure.

In FIG. 12, it is assumed that the security level of the first application is identified as the third security level, such that the third authority for controlling on/off operations of the image sensor, the infrared filter, and the IRED is assigned to the first application.

In operation 1210, the electronic device 101 or the processor 510 may obtain the image signal of the iris from the image sensor of the electronic device 101 based on an iris recognition command through the first application assigned with the third authority.

For example, the electronic device 101 or the processor 510 may turn on the IRED of the electronic device 101 and photograph the user's iris through the image sensor, based on an iris recognition command through the first application.

In operation 1220, the electronic device 101 or the processor 510 may perform iris recognition through the second application assigned with the authority for performing iris recognition, by using an image signal of the photographed iris.

For example, the electronic device 101 or the processor 510 may control the image signal of the photographed iris to be provided to the second application and perform iris recognition through the second application.

In operation 1230, the electronic device 101 or the processor 510 may control a result of iris recognition performed using the second application to be provided to the first application.

As such, the electronic device 101 may control the obtained image signal of the iris not to be provided to the first application assigned with the third authority and the result of iris recognition to be provided to the first application. In this way, the electronic device 101 may prevent information about the iris of the user to the first application that is not allowed to perform iris recognition, based on the security level.

Figure 13:
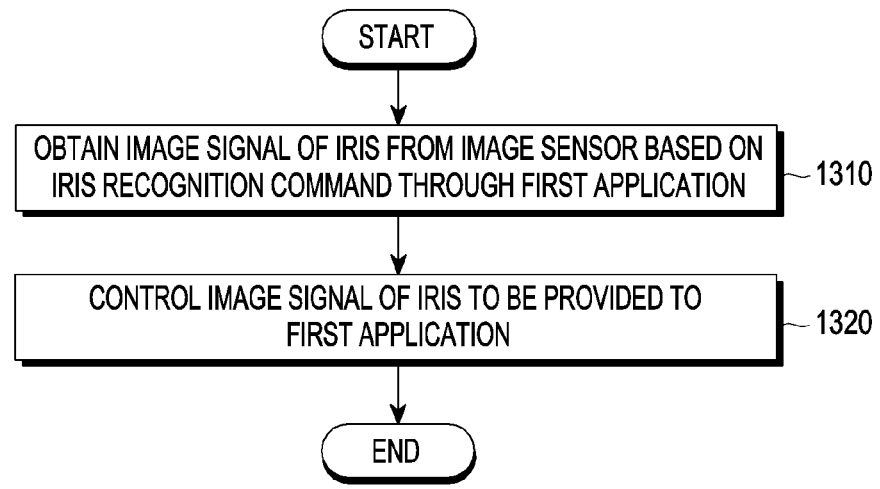
FIG. 13 is a flowchart illustrating a method for providing an image signal of an iris through an application of a specific security level by an electronic device according to various embodiments of the present disclosure.

FIG. 13 is a flowchart illustrating a method for providing an image signal of an iris through an application of a specific security level by an electronic device according to various embodiments of the present disclosure.

In FIG. 13, it is assumed that the security level of the first application is identified as the fourth security level, such that the fourth authority for controlling any operation of the image sensor, the infrared filter, and the IRED is assigned to the first application.

In operation 1310, the electronic device 101 or the processor 510 may obtain the image signal of the iris from the image sensor of the electronic device 101 based on an iris recognition command through the first application assigned with the fourth authority.

For example, the electronic device 101 or the processor 510 may turn on the IRED of the electronic device 101 and photograph the user's iris through the image sensor, based on an iris recognition command through the first application. The electronic device 101 or the processor 501 may control a pulse and an irradiation direction of light in an infrared wavelength band, irradiated through the IRED, as well as on/off operations of the IRED, based on the control command through the first application.

In operation 1320, the electronic device 101 or the processor 510 may control the image signal of the photographed iris to be provided to the first application assigned with the fourth authority. Thus, the electronic device 101 may allow iris recognition to be performed through the first application allowed to perform iris recognition, based on the security level, thereby improving utilization of an iris recognition function by the user.

Figure 14:
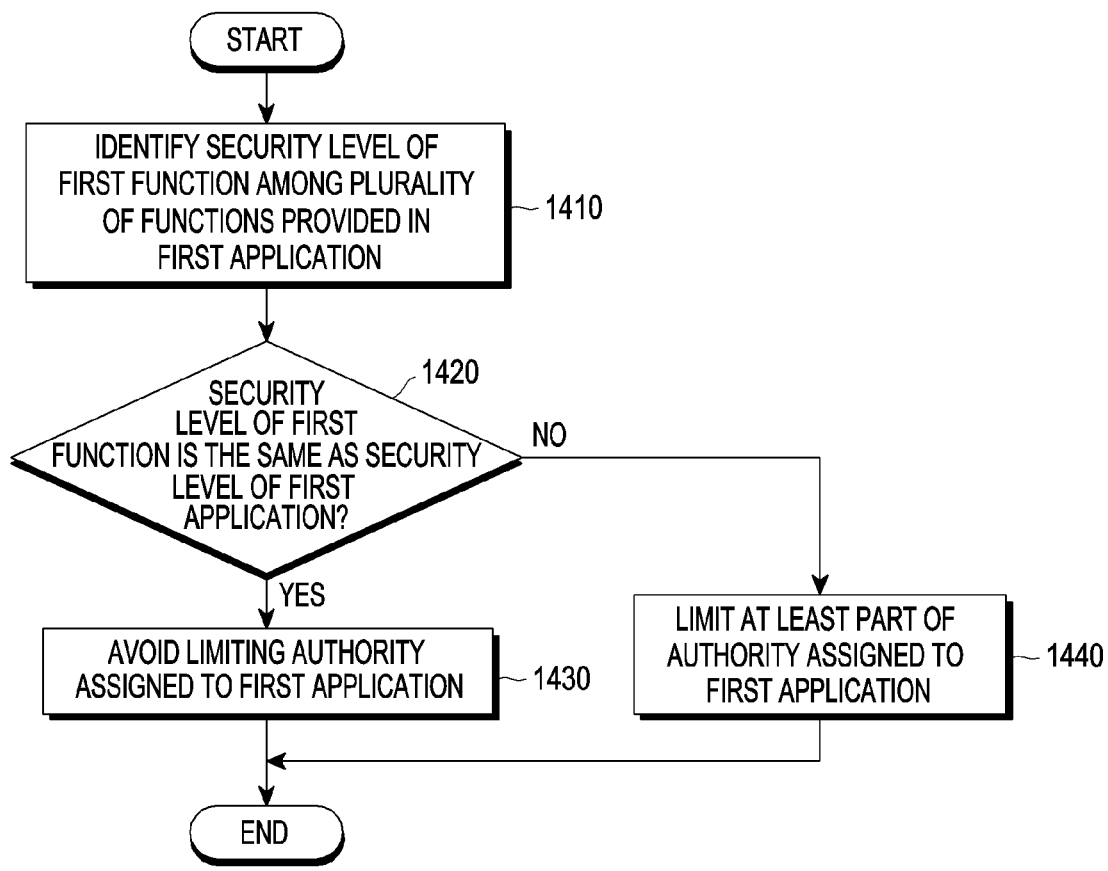
FIG. 14 is a flowchart illustrating a method for restricting an authority assigned to an application by an electronic device according to various embodiments of the present disclosure.

FIG. 14 is a flowchart illustrating a method for restricting an authority assigned to an application by an electronic device according to various embodiments of the present disclosure.

In operation 1410, the electronic device 101 or the processor 510 may identify the security level of the first function among the plurality of functions provided in the first application assigned with the authority. The electronic device 101 or the processor 510 may identify the security level of the first function among the plurality of functions when the first function is executed. The electronic device 101 or the processor 510 may also identify a security level of each of the plurality of functions provided in the first application, including the first function, in installation of the first application.

In operation 1420, the electronic device 101 or the processor 510 may determine whether to limit the authority assigned to the first application to execute the first function through the first application, based on the identified security level of the first function.

A security level of each of the plurality of functions provided in the first application may differ, such that the electronic device 101 may identify the security level of the first function and determine whether to limit the authority assigned to the first application based on the identified security level.

In operation 1430, when the security level of the first function is the same as the security level of the first application, the electronic device 101 or the processor 510 may not limit the assigned authority.

In operation 1440, when the security level of the first function is lower than the security level of the first application, the electronic device 101 or the processor 510 may determine to limit at least a part of the authority assigned to the first application based on the security level of the first function.

Although not shown, when the security level of the first function is higher than the security level of the first application, the electronic device 101 may assign an additional authority based on the security level of the first function.

Figure 15:
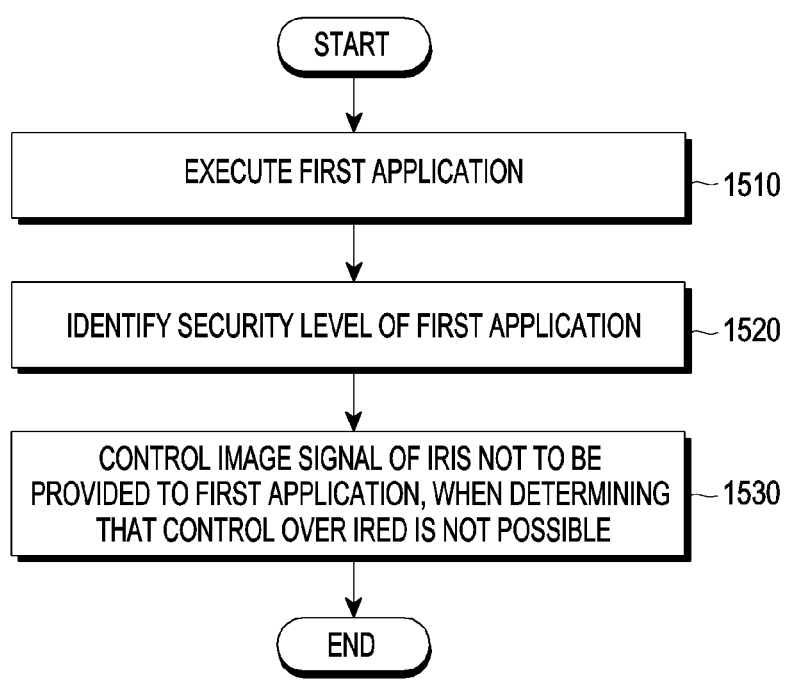
FIG. 15 is a flowchart illustrating an operation method of an electronic device based on a security level of an application according to various embodiments of the present disclosure.

FIG. 15 is a flowchart illustrating an operation method of an electronic device based on a security level of an application according to various embodiments of the present disclosure.

In operation 1510, the electronic device 101 or the processor 510 may execute the first application. The electronic device 101 or the processor 510 may display an execution screen of the executed first application.

In operation 1520, the electronic device 101 or the processor 510 may identify a security level of the first application. The electronic device 101 or the processor 510 may identify the security level of the first application, based on security level information indicating a security level of each of a plurality of applications stored in an external server that manages security levels of applications or stored in a memory of the electronic device 101.

In operation 1530, when determining that control of the electronic device 101 over the IRED is not possible through the first application based on the identified security level of the first application, the electronic device 101 or the processor 510 may control the image signal of the iris, obtained through the image sensor of the electronic device 101, not to be provided to the first application.

For example, when determining that control over the IRED is not possible through the first application based on the identified security level of the first application, the electronic device 101 or the processor 510 may control the image signal converted from light obtained from the image sensor and passing through the infrared filter, not to be provided to the first application.

For example, the electronic device 101 may manage an image signal or data provided to the first application, based on the authority assigned to the first application, thereby maintaining security of the image signal of the iris of the user.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions.

The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

According to various embodiments of the present disclosure, a non-transitory computer-readable recording medium has recorded thereon a program to be executed on a computer, in which the program includes executable instructions that cause, when executed by a processor, the processor to execute a first application, identify a security level of the first application, and assign an authority for controlling at least one of an image sensor, an infrared filter, or an IRED to the first application, based on the identified security level of the first application.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
an infrared filter configured to pass light in an infrared wavelength band;
an image sensor configured to convert received light into an image signal and output the image signal;
an infrared emitting diode (IRED) configured to irradiate the light in the infrared wavelength band; and
at least one processor,
wherein the at least one processor is configured to:
execute a first application;
identify a first security level indicating a security level of the first application;
assign, to the first application, a first authority for controlling the image sensor, the infrared filter, and the IRED, based on the first security level;
identify a second security level indicating that a security level of a first function among a plurality of functions provided in the first application;
identify whether the second security level is equal to the first security level;
assign, to the first function, the first authority based on identification that the second security level is equal to the first security level; and
assign, to the first function, a second authority for controlling one of the image sensor, the infrared filter, or the IRED based on identification that the second security level is lower than the first security level.

2. The electronic device of claim 1,
wherein the at least one processor comprises a first processor operated in a security region and a second processor operated in a non-security region,
wherein the second processor is configured to request the first processor to provide the first security level or the second security level, and
wherein the first processor is configured to identify the first security level or the second security level, and provide the first security level or the second security level to the second processor.

3. The electronic device of claim 2, further comprising a memory configured to store first information about a security level of each of a plurality of applications including the first application, and second information about a security level of each of a plurality of functions provided in each of the plurality of applications,
wherein the first processor is configured to identify the first security level or the second security level based on the first information and the second information stored in the memory.

4. The electronic device of claim 2, wherein the first processor is configured to:
obtain the first security level and the second security level from an external electronic device; and
identify the first security level and the second security level obtained from the external electronic device.

5. The electronic device of claim 1, wherein the at least one processor is configured to control on/off operations of the image sensor based on the first security level.

6. The electronic device of claim 5, wherein the at least one processor is configured to:
obtain an image signal of an iris from the image sensor based on an iris recognition command through the first application assigned with the first authority;
perform iris recognition by using the obtained image signal of the iris through a second application assigned with a third authority for performing iris recognition; and
control a result of iris recognition performed through the second application to be provided to the first application.

7. The electronic device of claim 1, wherein the at least one processor is configured to:
obtain an image signal of an iris from the image sensor based on an iris recognition command through the first application assigned with the first authority; and
control the obtained image signal of the iris to be provided to the first application.

8. A non-transitory computer-readable recording medium having recorded thereon a program to be executed on a computer,
wherein the program comprises executable instructions that cause, when executed by an electronic device, the electronic device to:
execute a first application;
identify a first security level indicating a security level of the first application;

assign, to the first application, a first authority for controlling an image sensor, an infrared filter, and an infrared emitting diode (IRED), based on the first security level;

identify a second security level indicating that a security level of a first function among a plurality of functions provided in the first application;

identify whether the second security level is equal to the first security level;

assign, to the first function, the first authority based on identification that the second security level is equal to the first security level; and assign, to the first function, a second authority for controlling one of the image sensor, the infrared filter, or the IRED based on identification that the second security level is lower than the first security level.

9. The non-transitory computer-readable recording medium of claim 8, wherein the program comprises the executable instructions that cause, when executed by the electronic device, the electronic device further to:

obtain the first security level and the second security level from an external electronic device; and identify the first security level and the second security level obtained from the external electronic device.

10. The non-transitory computer-readable recording medium of claim 8, wherein the program comprises the executable instructions that cause, when executed by the electronic device, the electronic device further to:

obtain an image signal of an iris from the image sensor based on an iris recognition command through the first application assigned with the first authority;

perform iris recognition by using the obtained image signal of the iris through a second application assigned with a third authority for performing iris recognition; and provide a result of iris recognition performed through the second application to the first application.

11. The non-transitory computer-readable recording medium of claim 8, wherein the program comprises the executable instructions that cause, when executed by the electronic device, the electronic device further to:

obtain an image signal of an iris from the image sensor based on an iris recognition command through the first application based one the first authority; and provide the obtained image signal of the iris to the first application.

12. The non-transitory computer-readable recording medium of claim 8, wherein the program comprises the executable instructions that cause, when executed by the electronic device, the electronic device further to:

control on/off operations of the image sensor based on the first security level.

13. The electronic device of claim 1, wherein the at least one processor is configured to:

execute a second application based on a first user input and allow the second application to use the image sensor while not allowing the first application to use the IRED, to generate a visible light image;

execute a third application based on a second user input and allow the third application to use the image sensor while allowing the second application to turn on or off the IRED, to generate an infrared light image; and execute a fourth application based on a third user input and allow the fourth application to use the image sensor while controlling the IRED to generate a selected pattern of a pulse, to generate an infrared light image, wherein the second application, the third application and the fourth application have different security levels.

* * * * *